US012637025B2

(12) United States Patent      (10) Patent No.:    US 12,637,025 B2

Bartlett et al.             (45) Date of Patent:     May 26, 2026

---

(54) VEHICLE SAFETY SYSTEM IMPLEMENTING ALGORITHM FOR EARLY SENSING OF HIGH-SPEED FULL OVERLAP CRASH EVENTS

(71) Applicant: ZF Friedrichshafen AG, Friedrichshafen (DE)

(72) Inventors: Charles A. Bartlett, Commerce Township, MI (US); Pawel Koziel, Czstochowa (PL); Michal Duchowski, Czstochowa (PL); Artur Fijalkowski, Czstochowa (PL); Kiran Balasubramanian, Canton, MI (US); Maciej Rejer, Konopiska (PL)

(73) Assignee: ZF Friedrichshafen AG, Friedrichshafen (DE)

( * ) Notice: Subject to any disclaimer, the term of this patent is extended or adjusted under 35 U.S.C. 154(b) by 188 days.

(21) Appl. No.: 18/266,838

(22) PCT Filed: Dec. 16, 2020

(86) PCT No.: PCT/IB2020/062060

§ 371 (c)(1),
(2) Date: Jun. 13, 2023

(87) PCT Pub. No.: WO2022/129996

PCT Pub. Date: Jun. 23, 2022

(65) Prior Publication Data

US 2024/0051485 A1     Feb. 15, 2024

(51) Int. Cl.
    *B60R 22/00*       (2006.01)
    *B60R 21/0132*     (2006.01)

(52) U.S. Cl.
    CPC .............................. *B60R 21/01332* (2014.12)

(58) Field of Classification Search
    CPC .................... B60R 21/01332; B60R 21/01336
    See application file for complete search history.

(56) References Cited

U.S. PATENT DOCUMENTS 6,005,479 A   *   12/1999   Ide ...................... B60R 21/0132
                                                180/282
6,167,335 A     12/2000   Ide et al.
                    (Continued)

FOREIGN PATENT DOCUMENTS

| DE | 10130962 A1 | 5/2002 |
| GB | 2343977 A | 5/2000 |
| WO | 2001054952 A2 | 8/2001 |

OTHER PUBLICATIONS

International Search Report and Written Opinion for PCT/IB2020/62060 mailed Sep. 8, 2021 (9 pages).

*Primary Examiner* — Adam M Alharbi

(74) *Attorney, Agent, or Firm* — Kristin L. Murphy

(57)                 ABSTRACT

A method for controlling an actuatable safety device for protecting an occupant of a vehicle includes sensing a left upfront vehicle acceleration via a left upfront sensor, sensing a middle upfront vehicle acceleration via a middle upfront sensor, and sensing a right upfront vehicle acceleration via a right upfront sensor. The method also includes sensing a central vehicle acceleration via a central airbag control unit. The method further includes determining the occurrence of a vehicle crash event in response to determining that each of the left, middle, and right upfront vehicle accelerations exceeds a predetermined magnitude and is phase shifted from the central vehicle acceleration.

6 Claims, 5 Drawing Sheets

(56)          References Cited

U.S. PATENT DOCUMENTS

2011/0282553 A1 *   11/2011   Foo ..................... B60R 21/0132
                                                            701/45
2017/0232919 A1       8/2017   Miyata et al.

* cited by examiner

VEHICLE SAFETY SYSTEM IMPLEMENTING ALGORITHM FOR EARLY SENSING OF HIGH-SPEED FULL OVERLAP CRASH EVENTS

CROSS-REFERENCE TO RELATED APPLICATIONS

This application is a national stage of International Application No. PCT/IB2020/62060, filed Dec. 16, 2020, the disclosure of which is incorporated herein by reference in its entirety.

TECHNICAL FIELD

Actuatable vehicle occupant protection systems, or "vehicle safety systems," include actuatable restraints, such as actuatable seatbelt retractors and airbags. These vehicle safety systems include a plurality of event sensors, such as accelerometers, and an electronic control unit, referred to herein as an airbag control unit ("ACU"). The ACU monitors signals provided by the sensors and makes determinations on whether to actuate the actuatable restraints.

BACKGROUND

For vehicle safety systems, it is desirable to discriminate amongst various collision or impact events ("crash events") in which a vehicle might be involved. Recognizing that real-life crash scenarios are limitless, crash tests have been developed to mimic the most common real-life crash scenarios in terms of crash type and crash severity. If the vehicle safety system can identify and discriminate between the various crash tests and actuate the actuatable restraints in response thereto, then the vehicle safety system will also perform in the real-life crash event.

Crash tests can involve a variety of impact types, such as frontal impacts, side impacts, offset impacts, and oblique or angular impacts, each of which is carried out at a prescribed velocity. Vehicle crash events can involve various impacting structures, such as a pole, a rigid barrier, or a deformable barrier. Deformable barriers can be stationary or moving. Each of these impacting structures are specifically designed to represent structures encountered in the real-life crash scenarios. For example, the pole crash test, can implement a pole designed to represent the typical telephone or traffic signal pole, the deformable barrier can be designed to represent another vehicle involved in the crash.

Vehicle safety systems can be configured or adapted to discriminate those crash events for which actuation of the actuatable restraints is desired from those crash events for which actuation of the actuatable restraints is not desired. Crash discrimination therefore entails determining the crash type, e.g., frontal, side, offset, oblique, angular, etc. Crash discrimination can also entail determining the impacting structure type, e.g., pole or deformable barrier. Crash discrimination can also entail determining the crash severity. Crash discrimination can further entail detecting misuse conditions, where vehicle impacts may be detected, but actuation of the actuatable restraints is not warranted. Examples of misuse conditions that can occur include off-road driving, rough roads, curb strikes, animal impacts, hammer blows (simulating rock or object strikes), potholes, and railroad crossings. Crash tests can be performed to simulate misuse conditions and verify that the vehicle safety system reacts in a desired manner.

Vehicle safety systems therefore must determine whether an event is a must-fire (MF) event, a no-fire (NF) event, or a misuse event. Must-fire events are those crash events for which airbag deployment must take place. It is for these crash events that further discrimination is desirable, because this further classification allows for tailoring the airbag deployment for the particular classified event. No-fire events are those whose magnitude does not warrant airbag deployment. Misuse events are events where the vehicle is being used in a non-traditional manner, such as off-road driving, and airbag deployment is not desired, even though the magnitude of the detected event may dictate otherwise.

The National Highway Traffic Safety Administration ("NHTSA") is a U.S. government agency that governs vehicle safety and assesses new car safety via its New Car Assessment Program (US-NCAP). Through US-NCAP, NHTSA establishes crash tests to establish the crashworthiness of new vehicles and rates those vehicles with a star rating, with a five-star rating being the best. The standards for these tests are issued as Federal Motor Vehicle Safety Standards (FMVSS), which NHTSA issues to implement safety laws passed by Congress. The FMVSS standards describe in detail the precise test procedures used to determine the US-NCAP ratings, which are determined from metrics measured for crash test dummies positioned in the vehicle at the time of the test.

The U.S. is not the only country to have its own new car assessment program. Other countries, such as China, Japan, and Australia, and other groups of countries, such as Europe and Latin America, have their own NCAP. While the new car ratings issued by these bodies are similar, some utilize crash tests with slightly different methods.

Over the years, safety standards are modified and updated to "push the envelope" when it comes to automotive safety. As a result, in keeping up with the standards, automobile manufacturers are pushed to constantly improve the safety of their products. As the standards become more rigorous, the safety systems adapt and become more complex and capable. Through the evolution of vehicle safety systems, it has been discovered that crash classification is one of the key aspects that helps determine the efficacy of the system. If the safety system can accurately and robustly identify the crash scenario as defined by a safety standard, it can take measures tailored to produce the best results for occupants involved in accidents for which the standard is designed.

While vehicle safety systems have been developed with the ability to discriminate a variety of crash events, there exists a continuing need to further classify and discriminate amongst crash events so that the vehicle safety system can take the appropriate responsive action. Among the crash events for which discrimination can be desired are different types of vehicle frontal impact crash events.

One exemplary frontal crash test is a high-speed full overlap crash test in which the vehicle impacts the rigid barrier at 56 kph (approximately 35 mph). Because this test involves a full overlap impact, the vehicle strikes the rigid barrier head-on, with the entire width of the vehicle striking the barrier. This is opposed to other crash tests, such as offset crash tests, where something less than the entire width of the vehicle front end, such as a left/right side or corner of the vehicle front end, strikes the barrier.

The high-speed full overlap crash test can, for example, simulate a head-on collision with another vehicle, or a rear-end collision with another vehicle. High-speed full overlap crash events develop quickly. Therefore, it is desirable for a vehicle safety system to discriminate this crash scenario as early on in the event as possible in order to maximize the time allowed for the safety system to deploy the necessary safety devices.

SUMMARY

The disclosure relates to a vehicle safety system that includes upfront satellite sensors, for example, right, middle, and left, that provide acceleration signals to an airbag control unit ("ACU"). The ACU implements a crash discrimination algorithm that utilizes the acceleration signals from the upfront sensors to discriminate the occurrence of a high-speed full overlap frontal crash. The algorithm implements crash discrimination metrics that utilize a phase shift between acceleration signals of the upfront sensors compared to those of the ACU to discriminate the high-sped full overlap frontal crash.

According to one exemplary aspect, a method for controlling an actuatable vehicle safety system for helping to protect a vehicle occupant comprises sensing a left upfront vehicle acceleration via a left upfront sensor; sensing a middle upfront vehicle acceleration via a middle upfront sensor; sensing a right upfront vehicle acceleration via a right upfront sensor; sensing a central vehicle acceleration via a central airbag control unit; and determining the occurrence of a vehicle crash event in response to determining that each of the left, middle, and right upfront vehicle accelerations exceeds a predetermined magnitude and is phase shifted from the central vehicle acceleration. In another exemplary arrangement, the method further comprises actuating the actuatable safety device in response to determining the occurrence of the vehicle crash. The vehicle crash event may comprise a high-speed full overlap crash event.

In a further exemplary arrangement, the method further comprises determining that each of the left, middle, and right upfront vehicle accelerations exceeds a predetermined magnitude and is phase shifted from the central vehicle acceleration comprises, for each upfront acceleration, by executing an upfront discrimination metric that evaluates an averaged upfront acceleration (UFS_AMA) and a vehicle displacement in a longitudinal vehicle direction (X_REL_D-ISP); implementing in the upfront discrimination metric a threshold configured to detect a phase shift between the upfront acceleration and the central vehicle acceleration; and determining a must-fire condition in response to the metric crossing the threshold.

In one exemplary arrangement, the threshold of the upfront discrimination metric comprises a portion of reduced magnitude configured to enhance detection of the phase shift between the upfront acceleration and the central vehicle acceleration. In one exemplary arrangement, the reduced magnitude portion of the threshold is V-shaped.

According to one exemplary aspect, a vehicle safety system for helping to protect a vehicle occupant comprises an actuatable safety device; a left upfront sensor; a middle upfront sensor; a right upfront sensor; and a central airbag control unit comprising a controller configured to perform a method for determining the occurrence of a vehicle crash event in response to determining that each of the left, middle, and right upfront vehicle sensor detect accelerations that exceed a predetermined magnitude and is phase shifted from the central vehicle acceleration and to actuate the actuatable safety device in response to detecting the occurrence of the vehicle crash.

In one exemplary arrangement, the left upfront sensor is mounted at a front left location of the vehicle; the middle upfront sensor is mounted at a front middle location of the vehicle; and the right upfront sensor is mounted at a front right location of the vehicle.

In one exemplary arrangement, the vehicle safety system detects the occurrence of the vehicle crash in response to detecting simultaneous phase shifts of the left, middle, and right upfront vehicle accelerations from the central vehicle acceleration.

According to a further exemplary aspect, a vehicle safety system comprises an actuatable safety device; a left upfront acceleration sensor; a middle upfront acceleration sensor; a right upfront acceleration sensor; and an airbag control unit (ACU) operatively connected to the safety device, the left upfront acceleration sensor, the middle upfront acceleration sensor, and the right upfront acceleration sensor. The airbag control unit comprises an ACU acceleration sensor and a controller. The controller is configured to detect the occurrence of the vehicle crash in response to determining that accelerations sensed by each of the left, middle, and right upfront acceleration sensors exceeds a predetermined magnitude and is phase shifted from an acceleration sensed by the ACU acceleration sensor.

DETAILED DESCRIPTION

In this description, reference is sometimes made to the left and right sides of a vehicle. These references should be understood as being taken with reference to the forward direction of vehicle travel. Thus, reference to the "left" side of a vehicle is meant to correspond to a driver side ("DS") of the vehicle. Reference to the "right" side of the vehicle is meant to correspond to a passenger side ("PS") of the vehicle.

Figure 1:
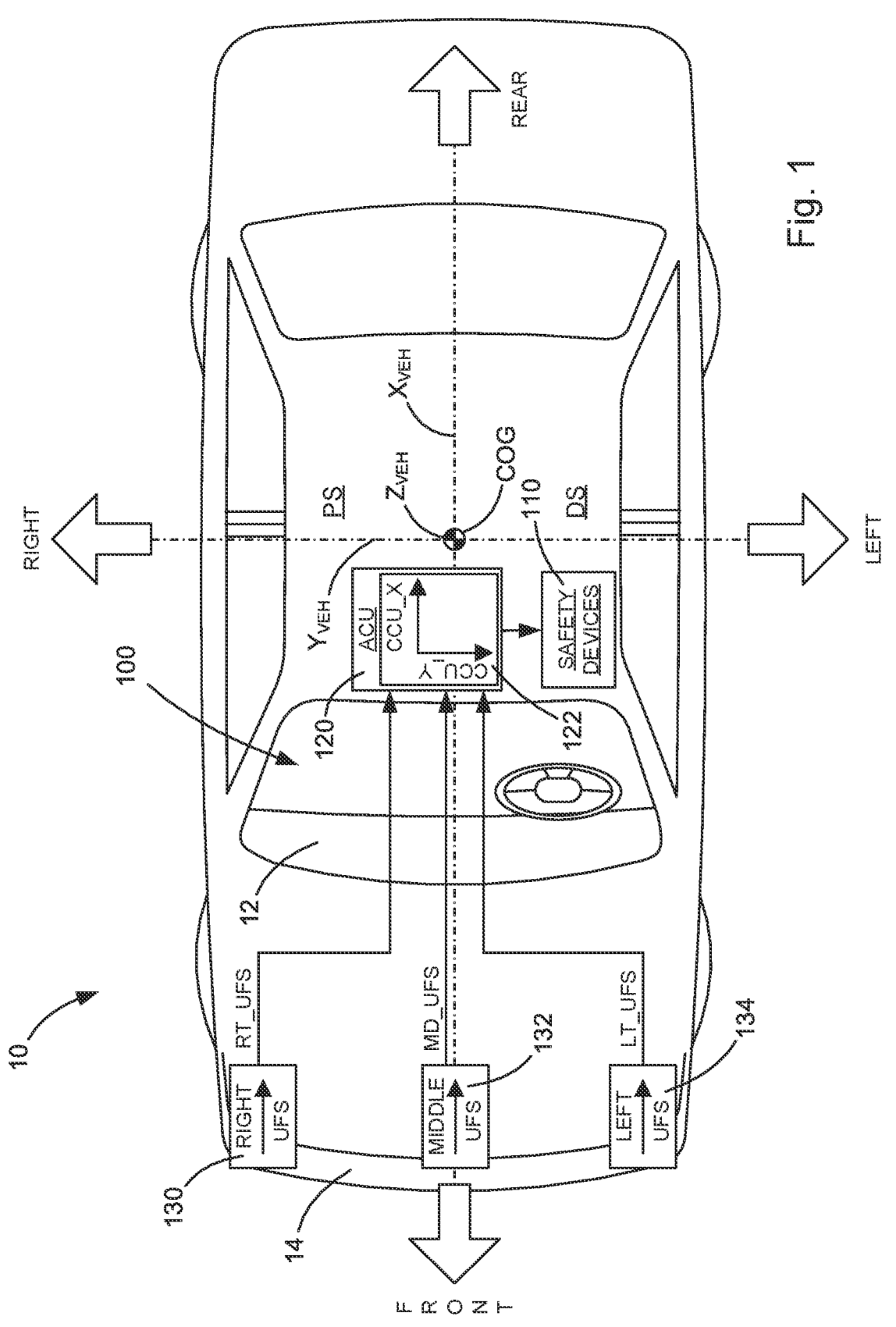
FIG. 1 is a schematic illustration of a vehicle including a vehicle safety system, according to one example configuration.

Also, in this description, certain descriptions are made with respect to vehicle axes, specifically, the X-axis, Y-axis, and Z-axis of the vehicle. The X-axis is a central, longitudinally extending axis of the vehicle represented in FIG. 1 at $X_{VEH}$. The Y-axis is a laterally extending axis of the vehicle that is perpendicular to the X-axis and is represented in FIG. 1 at $Y_{VEH}$. The Z-axis is a vertically extending axis of the vehicle that is perpendicular to both the X-axis and Y-axis and is represented in FIG. 1 at $Z_{VEH}$. The X-axis, Y-axis, and Z-axis intersect at or approximate to a center of gravity ("COG") of the vehicle.

Vehicle Safety System

Referring to FIG. 1, a vehicle 10 includes a vehicle safety system 100. The safety system 100 can include a plurality of actuatable vehicle safety devices, which are shown schematically at 110. The actuatable safety devices 110 can, for example, include airbags (e.g., frontal airbags, side impact airbags, curtain airbags, etc.) and seatbelts, e.g., seatbelt pretensioners. The protection devices 110 are also opera-tively connected to a central airbag control unit ("ACU") 120, which controls their actuation.

The ACU 120 is mounted centrally in the vehicle 10, at or rearward of the instrument panel 12. As shown, the ACU 120 is typically mounted at a central location between front seats of the vehicle 10. The system 100 further includes a plurality of satellite sensors 130, 132, 134 that are mounted remotely from the ACU 120 and operatively connected to the ACU. The satellite sensors 130, 132, 134 are accelerometers used for sensing vehicle accelerations and providing signals to the ACU 120 indicative of the sensed accelerations.

The satellite sensors 130, 132, 134 provide to the ACU 120 a digitized acceleration signals indicative of their indi-vidual sensed accelerations. The ACU 120 includes a con-troller that is programmed to utilize the digitized accelera-tion signals, to determine vehicle conditions, such as crash conditions, and to control actuation of the safety devices 110 in response to the determined vehicle conditions.

The ACU 120 includes an ACU sensor 122, which is integrated into the ACU 120. The ACU sensor 122 includes a two-axis accelerometer for measuring vehicle accelera-tions in the direction of the X-axis ($X_{VEH}$) and the Y-axis ($Y_{VEH}$) and determining values indicative of these sensed vehicle accelerations. CCU_X is a value indicative of vehicle acceleration measured in the direction of the vehicle X-axis at the location of the ACU 120. CCU_Y is a value indicative of vehicle acceleration measured in the direction of the vehicle Y-axis at the location of the ACU 120. The ACU 120 can use these signals to determine crashes and to discriminate amongst different crash types. CCU_X is implemented in the algorithms described herein, whereas CCU_Y is not.

The satellite sensors are upfront sensors mounted at the front end of the vehicle 10, e.g., at or near the front bumper 14. The satellite sensors include a right upfront sensor 130 that is mounted at or near the front-right corner of the vehicle 10, a middle upfront sensor 132 that is mounted at or near the front-middle of the vehicle, and a left upfront sensor 134 that is mounted at or near the front-left corner of the vehicle. The upfront sensors 130, 132, 134 are acceler-ometers that measure vehicle accelerations in the direction of the X-axis. The upfront sensors 130, 132, 134 are operable to produce right, middle, and left upfront X-axis acceleration signals RT_UFS, MD_UFS, and LT_UFS, respectively, which are provided to the ACU 120. The ACU 120 can use these signals to detect crashes and to discrimi-nate amongst different crash types according to the algo-rithms disclosed herein.

Signal Conditioning

Figure 2:
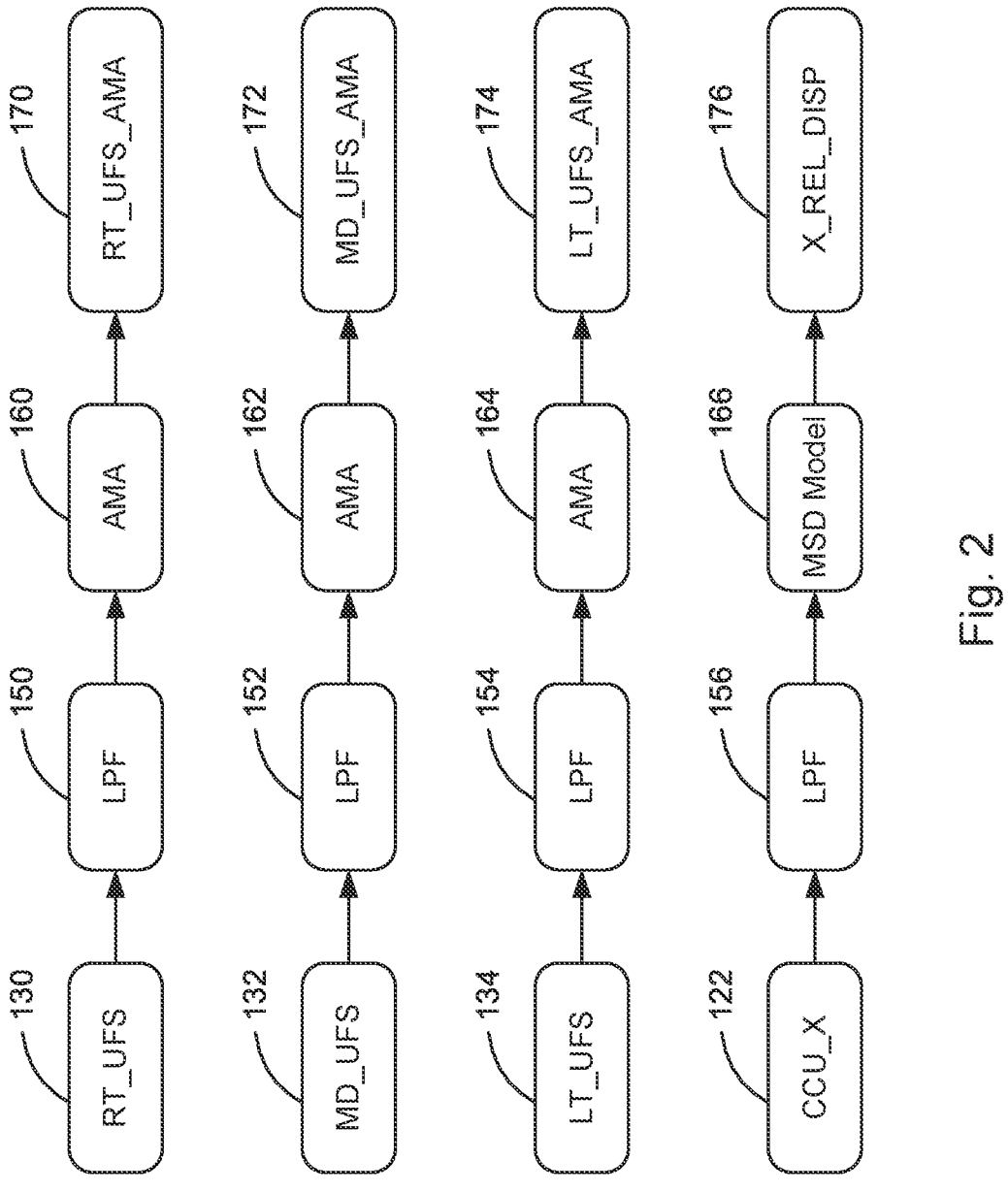
FIG. 2 is a schematic diagram illustrating the conditioning of crash signals implemented in the vehicle safety system.

FIG. 2 illustrates block diagrams showing the signal conditioning that the sensor data undergoes prior to being implemented in the discrimination algorithms disclosed herein. Each of the signals RT_UFS, MD_UFS, LT_UFS, and MD_UFS are conditioned via several different functions to produce associated conditioned signals. It is these con-ditioned signals that are implemented in the discrimination algorithms.

As shown in FIG. 2, the acceleration signal RT_UFS from the right UFS 130 undergoes low pass filtering (LPF block 150), which can be used to eliminate high frequency noise from the RT_UFS acceleration signal. An acceleration mov-ing average calculation (AMA block 160) with a tunable window size can be used to smooth the filtered acceleration signal. This conditioning produces the filtered, moving averaged signal RT_UFS_AMA illustrated at block 170.

Similarly, the acceleration signal MD_UFS from the middle UFS 132 undergoes low pass filtering (LPF block 152), which can be used to eliminate high frequency noise from the MD_UFS acceleration signal. An acceleration moving average calculation (AMA block 162) with a tunable window size can be used to smooth the filtered acceleration signal. This conditioning produces the filtered, moving averaged signal MD_UFS_AMA illustrated at block 172.

Similarly, the acceleration signal LT_UFS from the left UFS 134 undergoes low pass filtering (LPF block 154), which can be used to eliminate high frequency noise from the LT_UFS acceleration signal. An acceleration moving average calculation (AMA block 164) with a tunable win-dow size can be used to smooth the filtered acceleration signal. This conditioning produces the filtered, moving averaged signal LT_UFS_AMA illustrated at block 174.

Also, the acceleration signal CCU_X from the ACU sensor 122 undergoes low pass filtering (LPF block 156), which can be used to eliminate high frequency noise from the CCU_X acceleration signal. The low pass filtered CCU_X acceleration signal is provided to a damped spring mass (MSD) model 166, which uses damped spring mass modeling to produce a modeled value for relative displace-ment along the axis $X_{VEH}$ resulting from the impact that produced the CCU_X acceleration. This can be done accord-ing to known modeling methods, based on particular vehicle architectures and based on occupants having specified char-acteristics. Examples of this signal condition and modeling are described in detail in U.S. Pat. No. 5,935,182 to Foo et al. and U.S. Pat. No. 6,036,225 to Foo et al. The disclosures of these patents are hereby incorporated by reference in their entireties. This conditioning produces the modeled relative displacement signal X_REL_DISP illustrated at block 176.

High-Speed Full Overlap Crash Early Detection Algorithm

Figure 3:
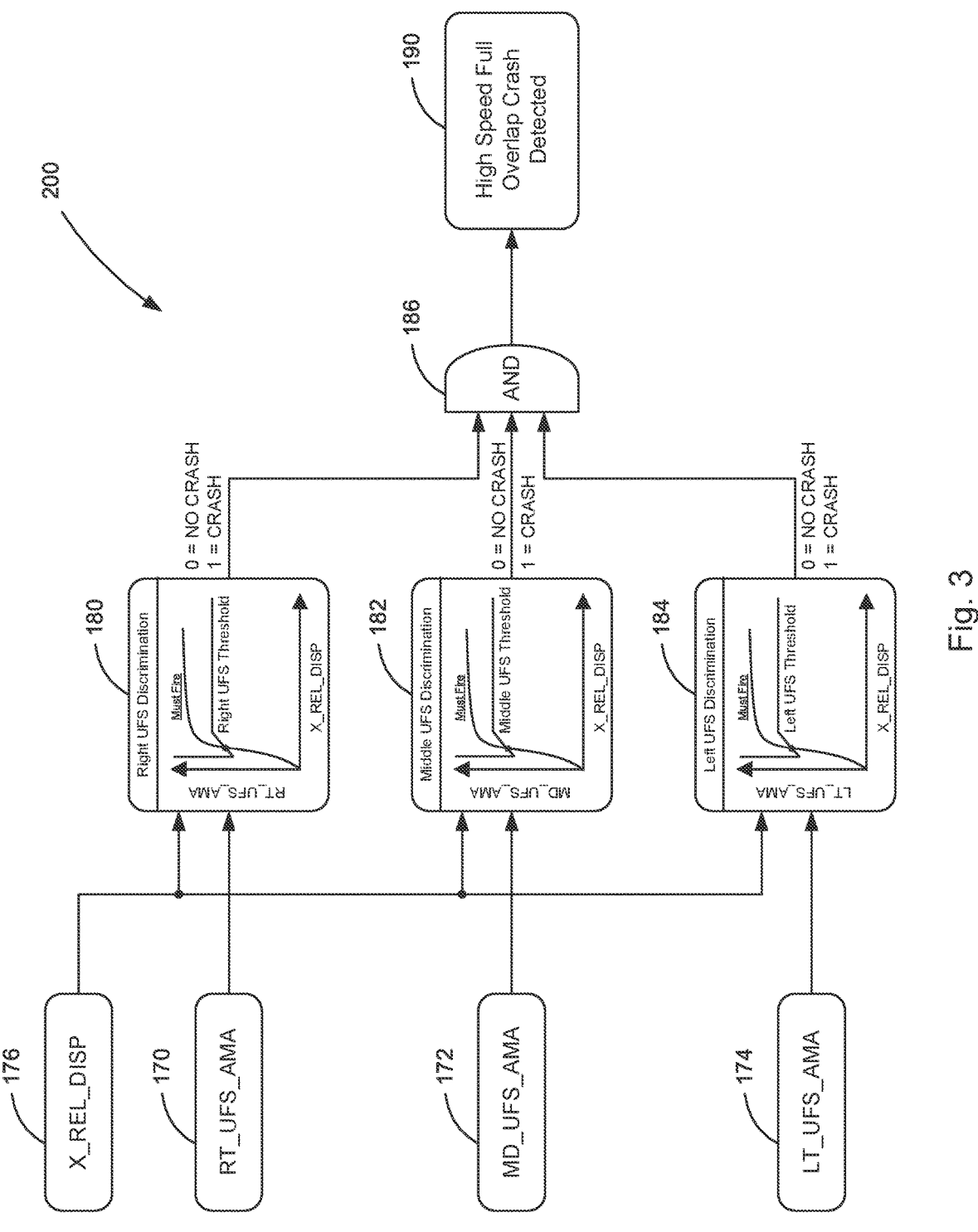
FIG. 3 is a diagram illustrating a crash discrimination algorithm implemented in the vehicle safety system.

FIG. 3 illustrates a discrimination algorithm 200 imple-mented by the vehicle safety system 100 to provide early detection of a high-speed full overlap crash. The discrimi-nation algorithm 200 utilizes the conditioned signals deter-mined according to FIG. 2 to achieve early detection of a high-speed full overlap crash event so that the vehicle safety system 100 can respond by deploying one or more of the safety devices 110. The discrimination algorithm 200 imple-ments three discrimination metrics to provide the early crash detection.

A right UFS discrimination metric 180 evaluates the magnitudes of the RT_UFS_AMA signal 170 and the X_REL_DISP signal 176. If the metric exceeds a predeter-mined right UFS threshold, a crash is determined and the right UFS discrimination metric 180 outputs a logical 1. Otherwise, the right UFS discrimination metric 180 outputs a logical 0.

A middle UFS discrimination metric 182 evaluates the magnitudes of the MD_UFS_AMA signal 172 and the X_REL_DISP signal 176. If the metric exceeds a predeter-mined middle UFS threshold, a crash is determined and the middle UFS discrimination metric 182 outputs a logical 1. Otherwise, the middle UFS discrimination metric 182 out-puts a logical 0.

A left UFS discrimination metric 184 evaluates the mag-nitudes of the LT_UFS_AMA signal 174 and the X_REL_D-ISP signal 176. If the metric exceeds a predetermined left UFS threshold, a crash is determined and the left UFS discrimination metric 184 outputs a logical 1. Otherwise, the left UFS discrimination metric 184 outputs a logical 0.

The outputs of the discrimination metrics 180, 182, 184 are provided to a logical AND block 186. As shown, if all three discrimination metrics 180, 182, 184 are in agreement, i.e., all three discrimination metrics indicate the occurrence of a crash (logical 1), the AND block 186 indicates a logical 1, which indicates that a high-speed full overlap crash is detected. The discrimination algorithm 200 produces a high-speed full overlap crash detected signal, which is illustrated at block 190 in FIG. 3. In response to the high-speed full overlap crash detected signal 190 the ACU 120 actuates one or more of the safety devices 110 (see FIG. 1).

In order to detect the high-speed full overlap crash event, the discrimination algorithm 200 requires agreement from all three UFS discrimination metrics 180, 182, 184. Because of this agreement, no further verification of the event is necessary as the high-speed full overlap crash is detected with a high degree of confidence. Because the discrimination algorithm 200 requires agreement across the entire front end of the vehicle 10, discrimination of the high-speed full overlap crash event is performed to the exclusion of other front impact crash events, even if they are similar.

For example, a high-speed offset crash event, such as a high-speed left offset crash event, could produce a phase shift causing the left UFS discrimination metric 184 discriminate a crash. Depending on the degree of offset and the severity of the offset crash, the middle UFS discrimination metric 182 could also discriminate a crash. The right UFS discrimination metric 180 would not, however, discriminate a crash as the right UFS 130 would not be impacted and, therefore, there would be no phase shift detection. The lack of agreement by this single UFS discrimination metric is sufficient to prevent the discrimination algorithm 200 from detecting the high-speed full overlap crash event.

This is not to say that the safety system 100 would not detect and react to the example left offset crash event mentioned in the previous paragraph. The safety system 100 could and most certainly would include other discrimination algorithms tasked with detecting overlap crashes, and would undoubtedly respond to an offset crash event in an appropriate manner. The point here is that the discrimination algorithm 200 provides a fast response to high-speed full overlap crash events, and defers to other discrimination algorithms for discriminating other crash types.

Frontal High-Speed Full Overlap Crash Characteristics

Figure 4A:
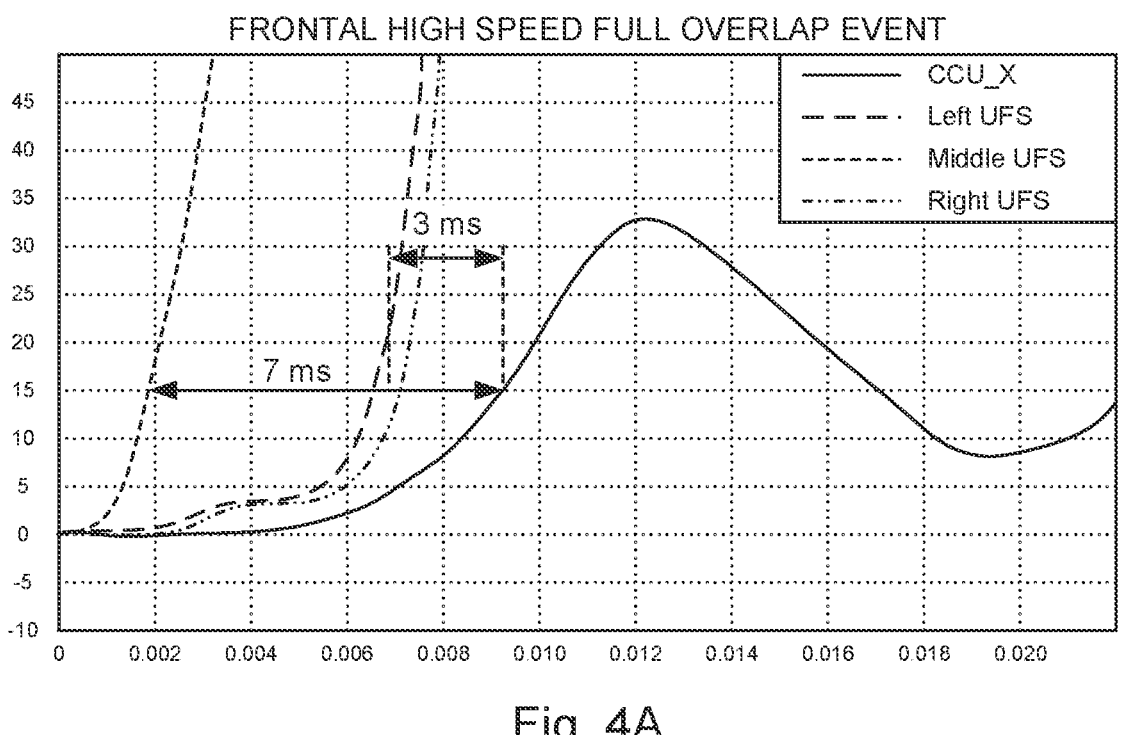
FIGS. 4A-4B are graphs representing crash test data related to the development of the crash discrimination algorithm implemented in the vehicle safety system.
Figure 4B:
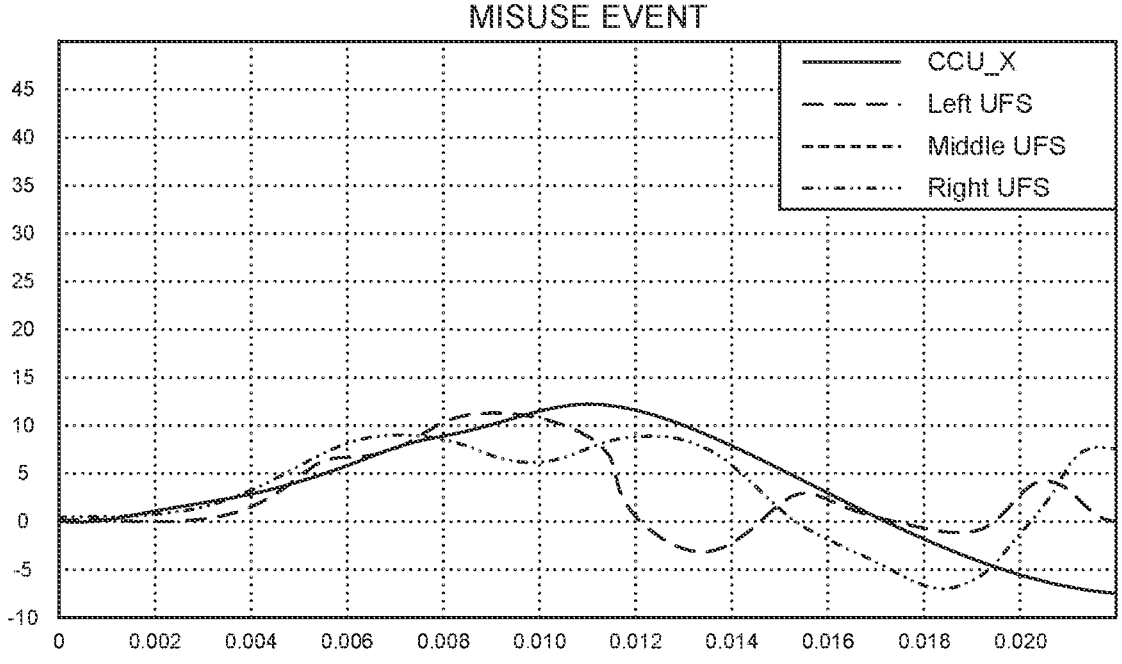

FIGS. 4A-B are graphs representing recorded crash test data. The graphs illustrate how the various sensors described herein react to different types of crash scenarios. FIG. 4A illustrates sensor responses to a frontal high-speed full overlap crash test. FIG. 4B illustrates sensor responses to a misuse condition crash test. For the example of FIG. 4B, the misuse condition is a frontal curb event, where the vehicle drives over a curb in a direction perpendicular to the curb.

As shown in FIG. 4A, because the crash event is a frontal full overlap high-speed event, the upfront sensors register the crash acceleration before the ACU sensor registers the crash acceleration. This is because the UFS sensors are mounted up front in the vehicle and because the vehicle deforms (e.g., crush or crumple) in response to the crash. This delays the acceleration of the ACU, which is mounted rearward, e.g., centrally, in the vehicle. Because of this, it can be understood that there is a delay between the UFS accelerations and the ACU acceleration. As a result, there is a phase shift between in the acceleration signals outputted by the upfront sensors and the ACU sensor. In the example crash test of FIG. 4B, the phase shift is about 7 milliseconds for the Middle UFS and about 3 milliseconds for the Left UFS and Right UFS.

In comparison, as shown in FIG. 4B, it can be seen that there is no appreciable phase shift in the accelerations measured by the upfront sensors and the ACU sensor for the misuse event. This is because the magnitude of the misuse event is lower than the frontal high-speed full overlap crash event. Because of this, the vehicle does not deform appreciably in response to the event, and all of the acceleration sensors, both the upfront sensors and the ACU sensor, respond to the vehicle accelerations more simultaneously, i.e., with little or no delay. There is, therefore, no appreciable phase shift in the acceleration signals produced by the upfront sensors and the ACU sensor.

Figure 5:
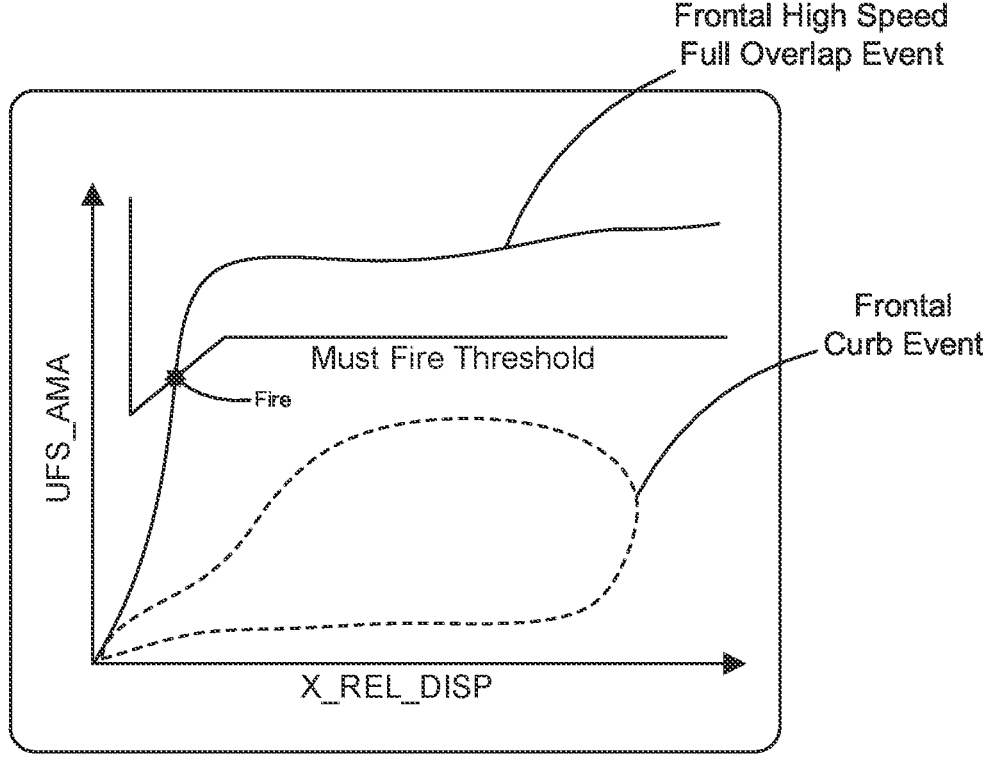
FIG. 5 is a schematic diagram illustrating a crash discrimination metric implemented in the crash discrimination algorithm implemented in the vehicle safety system.

These phenomena are borne out by the example crash discrimination metric of FIG. 5. FIG. 5 illustrates the upfront sensor response to the events of FIGS. 4A and 4B. For the frontal high-speed full overlap event, the metric exhibits an initially high slope, crossing the must-fire threshold, and then leveling out thereafter. This is a result of the phase shift between the upfront sensors and the ACU sensor shown in FIG. 4A. During the initial phase of the crash, during the initial vehicle deformation and prior to the ACU sensor experiencing the full acceleration of the vehicle, the magnitude of the UFS_AMA signals measured by the upfront sensors are high in comparison with the X_REL_DISP signal measured by the ACU sensor. The magnitude of the metric therefore is primarily due to upfront sensor acceleration.

The must-fire threshold is configured, i.e., shaped, to promote detecting the phase shift between the upfront acceleration and ACU acceleration. As shown in FIG. 5, the initial portion of the must fire threshold, i.e., to the left as viewed in the figure, is lower in magnitude than the remainder of the threshold, i.e., those portions to the right as viewed in the figure. In the example configuration of the metric shown in FIG. 5, this lower magnitude portion of the threshold is generally V-shaped. The shape could, however be shaped differently while maintaining the lower magnitude characteristics. The lower magnitude portion could, for example, be squares or rectangular, curved (e.g., U-shaped), stepped, etc. Due to the lower magnitude of this phase shift detecting portion of the threshold, the phase shift, indicated by the steep slope of the metric, can be detected more quickly and readily, thereby enhancing the response of the metric.

After the initial vehicle deformation, the ACU sensor accelerates and its output increases accordingly, while the upfront sensor outputs decrease due to their acceleration heading toward completion. As a result, it can be seen that the metric levels out, which is expected, as the magnitude of the metric is primarily due to ACU acceleration.

From the above, it can be seen that when the upfront sensor and ACU sensor accelerations are not phase shifted and occur simultaneously or substantially simultaneously, the slope of the metric will be less steep. Additionally, when the magnitudes of the accelerations are not sufficiently high, the must-fire threshold will not be crossed, regardless of any phase shift. Therefore, it will be appreciated that the must-fire threshold implemented in the metric is configured, i.e., shaped, so that the initial steep sloped acceleration indicative of a high magnitude accelerations measured by the upfront sensors that are phase shifted from the ACU sensor are captured as must-fire events.

Viewing the metric for the misuse event, it can be seen that, because there is no delay/phase shift between the upfront sensors and the ACU sensor, the magnitude of the metric increases along a less steep slope, i.e., the rise and run of the metric are more equal. This is because both the upfront sensors and the ACU sensor undergo acceleration in a more simultaneous manner. Additionally, for the misuse event, the magnitudes of the accelerations are not sufficient to cross the must-fire threshold. The metric therefore misses the must-fire threshold.

Early Crash Detection Enabled by Phase Shift Sensing

Typically, crash discrimination involves two steps—crash detection and crash verification/classification. The crash detection can be triggered by a variety of sensors or combination of sensors. For example, a measured ACU sensor acceleration that exceeds a threshold magnitude can be used to detect that a crash has occurred. When this occurs, the safety system generates a request to actuate one or more of the vehicle safety devices. At the same time, crash classification algorithms utilized sensed crash data classify the type and/or severity of the sensed crash. As a result of this verification, the safety system deploys the protection devices.

Advantageously, the vehicle safety system 100 disclosed herein implements a sensor structure and algorithm that avoids the need for classifying/verifying the sensed crash condition. The elimination of this necessity results in the ability of the safety system 100 to deploy the protection devices 110 early on in the high-speed full overlap crash event. Because the safety system 100 implements the three upfront sensors 130, 132, 134, the algorithm 200 is able to distinguish the occurrence of a specific event—a high-speed full overlap crash event—in response to immediate and substantially simultaneous response of the three discrimination metrics 180, 182, 184 associated with those sensors. The three upfront sensors being in agreement at this early stage of this specific type of crash event is sufficient to deploy the safety devices 110 without any further classification or verification.

The implementation of the sensor architecture and discrimination algorithm improves the time-to-fire ("TTF") performance of the vehicle safety system 100 in the event of a high-speed full overlap crash event. Testing has shown that a TTF in the range of 3-5 milliseconds in response to a high-speed full overlap crash event can be reliably achieved while, at the same time, discriminating a "no fire" condition in response to a misuse event.

From the above description of the invention, those skilled in the art will perceive improvements, changes and modifications. For example, the figures illustrating the various metrics implemented in the disclosed vehicle safety system show thresholds with a particular "shape." The illustrated thresholds are by way of example only. Those skilled in the art will appreciate that the characteristics of these metrics, i.e., the shapes of the lines identifying the thresholds, can vary depending on a variety of factors, such as the configuration of the particular vehicle (i.e., the particular platform or model of the vehicle) in which the safety system is implemented and the design criteria for the safety system implemented in the particular vehicle, Such improvements, changes, and/or modifications within the skill of the art are intended to be covered by the appended claims.

Having described the invention, the following claimed is:

1. A method for controlling an actuatable safety device for protecting an occupant of a vehicle, the method comprising:

sensing a left upfront vehicle acceleration via a left upfront sensor mounted at a front-left corner of the vehicle;

sensing a middle upfront vehicle acceleration via a middle upfront sensor mounted at a front-middle location of the vehicle;

sensing a right upfront vehicle acceleration via a right upfront sensor mounted at a front-right corner of the vehicle;

sensing a central vehicle acceleration via a central airbag control unit; determining an averaged upfront acceleration (UFS_AMA) for each of the left, middle, and right upfront vehicle accelerations;

determining a vehicle displacement in a longitudinal vehicle direction (X_REL_DISP) based on the central vehicle acceleration;

implementing, for each upfront acceleration, an upfront discrimination metric that evaluates the averaged upfront acceleration (UFS_AMA) against the vehicle displacement in the longitudinal vehicle direction (X_REL_DISP);

applying for each upfront discrimination metric, a threshold having a portion of reduced magnitude configured to enhance detection of a phase shift between the upfront acceleration and the central vehicle acceleration, wherein the threshold comprises a V-shaped reduced magnitude portion;

determining an occurrence of a vehicle crash event in response to determining all three upfront discrimination metrics simultaneously crossing their respective thresholds, wherein the simultaneous crossing indicates that each of the left, middle, and right upfront vehicle accelerations exceeds a predetermined magnitude and is phase shifted from the central vehicle acceleration; and actuating the actuatable safety device in response to determining the occurrence of the vehicle crash event.

2. The method recited in claim 1, wherein determining that each of the left, middle, and right upfront vehicle accelerations exceeds a predetermined magnitude and is phase shifted from the central vehicle acceleration comprises, for each upfront acceleration:

executing an upfront discrimination metric that evaluates an averaged upfront acceleration (UFS_AMA) and a vehicle displacement in a longitudinal vehicle direction (X_REL_DISP);

implementing in the upfront discrimination metric, a threshold configured to detect a phase shift between the averaged upfront acceleration and the central vehicle acceleration; and determine a must-fire condition in response to the upfront discrimination metric crossing the threshold.

3. The method recited in claim 2, wherein the threshold of the upfront discrimination metric comprises a portion of reduced magnitude configured to enhance detection of the phase shift between the averaged upfront acceleration and the central vehicle acceleration.

4. The method recited in claim 1, wherein the vehicle crash event comprises a high-speed full overlap crash event.

5. A vehicle safety system comprising:

an actuatable safety device;

a left upfront sensor;

a middle upfront sensor;

a right upfront sensor; and a central airbag control unit comprising a controller configured to:

determine an averaged upfront acceleration (UFS_AMA) for each of the left, middle, and right upfront vehicle accelerations;

determine a vehicle displacement in a longitudinal vehicle direction (X_REL_DISP) based on the central vehicle acceleration;

implement, for each upfront acceleration, an upfront discrimination metric that evaluates the averaged upfront acceleration (UFS_AMA) against the vehicle displacement in the longitudinal vehicle direction (X_REL_DISP);

apply for each upfront discrimination metric, a threshold having a portion of reduced magnitude configured to enhance detection of a phase shift between the upfront acceleration and the central vehicle acceleration, wherein the threshold comprises a V-shaped reduced magnitude portion;

determine an occurrence of a vehicle crash event in response to determining all three upfront discrimination metrics simultaneously crossing their respective thresholds, wherein the simultaneous crossing indicates that each of the left, middle, and right upfront vehicle accelerations exceeds a predetermined magnitude and is phase shifted from the central vehicle acceleration; and actuate the actuatable safety device in response to determining the occurrence of the vehicle crash event.

6. A vehicle safety system comprising:

an actuatable safety device;

a left upfront sensor mounted at a front-left corner of the vehicle;

a middle upfront sensor mounted at a front-middle location of the vehicle;

a right upfront sensor mounted at a front-right corner of the vehicle; and an airbag control unit (ACU) operatively connected to the actuatable safety device, the left upfront acceleration sensor, the middle upfront acceleration sensor, and the right upfront acceleration sensor;

wherein the airbag control unit comprises an airbag control unit acceleration sensor and a controller, the controller being configured to determine an averaged upfront acceleration (UFS_AMA) for each of the left, middle, and right upfront vehicle accelerations;

determine a vehicle displacement in a longitudinal vehicle direction (X_REL_DISP) based on the central vehicle acceleration;

implement, for each upfront acceleration, an upfront discrimination metric that evaluates the averaged upfront acceleration (UFS_AMA) against the vehicle displacement in the longitudinal vehicle direction (X_REL_DISP);

apply for each upfront discrimination metric, a threshold having a portion of reduced magnitude configured to enhance detection of a phase shift between the upfront acceleration and the central vehicle acceleration, wherein the threshold comprises a V-shaped reduced magnitude portion;

determine an occurrence of a vehicle crash event in response to determining all three upfront discrimination metrics simultaneously crossing their respective thresholds, wherein the simultaneous crossing indicates that each of the left, middle, and right upfront vehicle accelerations exceeds a predetermined magnitude and is phase shifted from the central vehicle acceleration; and actuate the actuatable safety device in response to determining the occurrence of the vehicle crash event.

* * * * *